US005261466A

United States Patent [19]

Koyanagi

[11] Patent Number: 5,261,466

[45] Date of Patent: Nov. 16, 1993

[54] PROCESS FOR CONTINUOUSLY FILLING FLUID INTO A PLURALITY OF CLOSED BAGS

[75] Inventor: Shingo Koyanagi, Kashihara, Japan

[73] Assignee: Kabushikikaisha Kashiharaseitai, Osaka, Japan

[21] Appl. No.: 898,678

[22] Filed: Jun. 15, 1992

[30] Foreign Application Priority Data

Jun. 25, 1991 [JP] Japan ................................. 3-181774

[51] Int. Cl.[5] ........................ B65B 3/17; B65D 30/24; F16K 15/00

[52] U.S. Cl. ........................................ 141/10; 141/67; 141/114; 141/237; 141/313; 53/385.1; 53/570

[58] Field of Search ........................ 141/10, 67, 68, 70, 141/131, 132, 134, 164, 166, 176, 234, 236, 237, 242, 244, 246, 114, 1, 313-317, 98, 325, 329, 330; 53/384.1, 385.1, 559, 567, 568, 403, 570-573, 457, 455, 459, 467, 469, 562

[56] References Cited

U.S. PATENT DOCUMENTS 4,265,279 5/1981 Weikert ................................ 141/10
4,514,962 5/1985 Ausnit .................................. 53/457
4,698,954 10/1987 Behr et al. ........................ 53/567 X
4,794,750 1/1989 Schmidt et al. .................. 53/455 X
4,850,912 7/1989 Koyanagi ............................. 441/40
4,856,261 8/1989 Hackett eet al. ...................... 53/469

FOREIGN PATENT DOCUMENTS 974501 11/1964 United Kingdom .

*Primary Examiner*—Henry J. Recla
*Assistant Examiner*—Casey Jacyna
*Attorney, Agent, or Firm*—Larson and Taylor

[57] ABSTRACT

A process for continuously filling a fluid into a plurality of closed bags joined together in the form of an elongated sheet made of two superposed plastics films, the sheet having a baglike flat fluid inlet tube extending longitudinally thereof and formed by heat-sealing the films, the bags being arranged side by side along at least one side of the inlet tube and joined to one another and to the tube, each of the bags being provided inside thereof with a check valve of plastics film adjacent to the tube, the inlet tube being in communication with the bags individually only through a fluid channel of the check valve in each bag. The process comprises the steps of transporting the sheet forward, closing the inlet tube of the sheet by pressing the tube with closing means disposed in the path of transport of the sheet, introducing the fluid into the tube by a fluid supply device having a portion inserted in the tube at a position to the front of the closing means and cutting the tube open longitudinally thereof by a cutter provided on the supply device utilizing the transport of the sheet, filling the bags positioned to the front of the closing means with the fluid introduced into the tube through the check valve, and cutting off a required length of the sheet including the bags filled with the fluid.

6 Claims, 6 Drawing Sheets

PROCESS FOR CONTINUOUSLY FILLING FLUID INTO A PLURALITY OF CLOSED BAGS

BACKGROUND OF THE INVENTION

The present invention relates to a process for continuously filling a fluid, such as air, into a plurality of closed bags which are arranged side by side and joined to one another.

Closed bags arranged side by side and joined to one another into a sheet are already known as disclosed, for example, in Laid-Open Japanese Utility Model Application HEI 1-164142 (1989) previously filed by the present inventor. The disclosed group of closed bags is made of two rectangular plastics films and provided with a bag-like flat fluid inlet tube formed by heat-sealing the films at required portions and having a fluid inlet at one end and closed at the other end. The bags are joined to one side edge of the inlet tube and each provided inside thereof with a check valve which is made of plastics film and positioned adjacent to the joint. The inlet tube is in communication with each of the bags only through the flow channel of the check valve.

However, since the group of closed bags thus formed is not in the form of an elongated sheet, all the bags need to be filled with air or like fluid when to be filled therewith. Accordingly, it is impossible to fill the fluid only into specified bags in the group of bags for a particular use contemplated. Another problem encountered is that such groups of bags can not be filled by a continuous operation.

SUMMARY OF THE INVENTION

The present invention has been accomplished to overcome the above problems and provides a process for continuously filling a fluid into a plurality of closed bags which are arranged side by side and joined to one another into an elongated sheet.

The main object of the present invention is to provide a process for continuously filling air or like fluid into such closed bags which process is adapted to fill the fluid only into the bags over a required length of the sheet by a continuous, efficient and convenient operation as desired.

To fulfill the above object, the present invention provides a process for continuously filling a fluid into a plurality of closed flat bags joined together in the form of an elongated sheet made of two superposed elongated rectangular plastics films, the sheet having a bag-like flat fluid inlet tube extending longitudinally thereof and formed by heat-sealing required portions of the films, the plurality of closed bags being arranged side by side along at least one side of the inlet tube and joined to one another and to the inlet tube, each of the closed bags being provided inside thereof with a check valve made of plastics film and positioned adjacent to the inlet tube, the inlet tube being in communication with the plurality of bags individually only through a fluid channel of the check value in each bag, the process being characterized in that the process comprises the steps of:

transporting the elongated sheet forward, closing the inlet tube of the sheet by pressing the inlet tube with closing means disposed in the path of transport of the sheet, introducing the fluid into the inlet tube by a fluid supply device having a required portion inserted in the inlet tube at a position to the front of the closing means and cutting the inlet tube open longitudinally thereof by cutting means provided on the supply device utilizing the transport of the sheet, filling the closed bags positioned to the front of the closing means with the fluid introduced into the inlet tube hermetically through the check valve, and cutting off a required length of the sheet including the bags hermetically filled with the fluid.

The process of the invention is further characterized in that during the transport of the elongated sheet, the fluid supply device is suitably moved rearward for the cutting means on the supply device to cut the inlet tube open longitudinally thereof. Alternatively, the process is characterized in that during the transport of the elongated sheet, the fluid supply device is fixed in position for the cutting means on the supply device to cut the inlet tube open longitudinally thereof. The process is further characterized in that the elongated sheet is transported intermittently.

The process of the invention is further characterized in that a side portion of the inlet tube is cut open with the cutting means on the fluid supply device. Alternatively, the process is characterized in that a planar portion of the inlet tube is cut open with the cutting means on the fluid supply device.

With the process of the present invention, the fluid supply device is inserted into the inlet tube of the elonaged sheet which is being transported forward to introduce a fluid into the tube which is closed at a position rearward from the supply device, whereby the fluid introduced into the inlet tube is filled successively into the closed bags which are present between the supply device and the closed portion of the tube by way of the fluid channel of the check valve in each of the bags. Thus, the bags can be filled with the fluid hermetically properly with a high efficiency.

During the filling operation, the inlet tube is continuously cut open longitudinally thereof by the transport of the sheet and the cutting means on the supply device, permitting the closed bags to be filled with the fluid continuously upon moving past the closing position. This ensures a continuous, smooth and reliable filling operation as desired.

DESCRIPTION OF THE PREFERRED EMBODIMENTS

Figure 1:
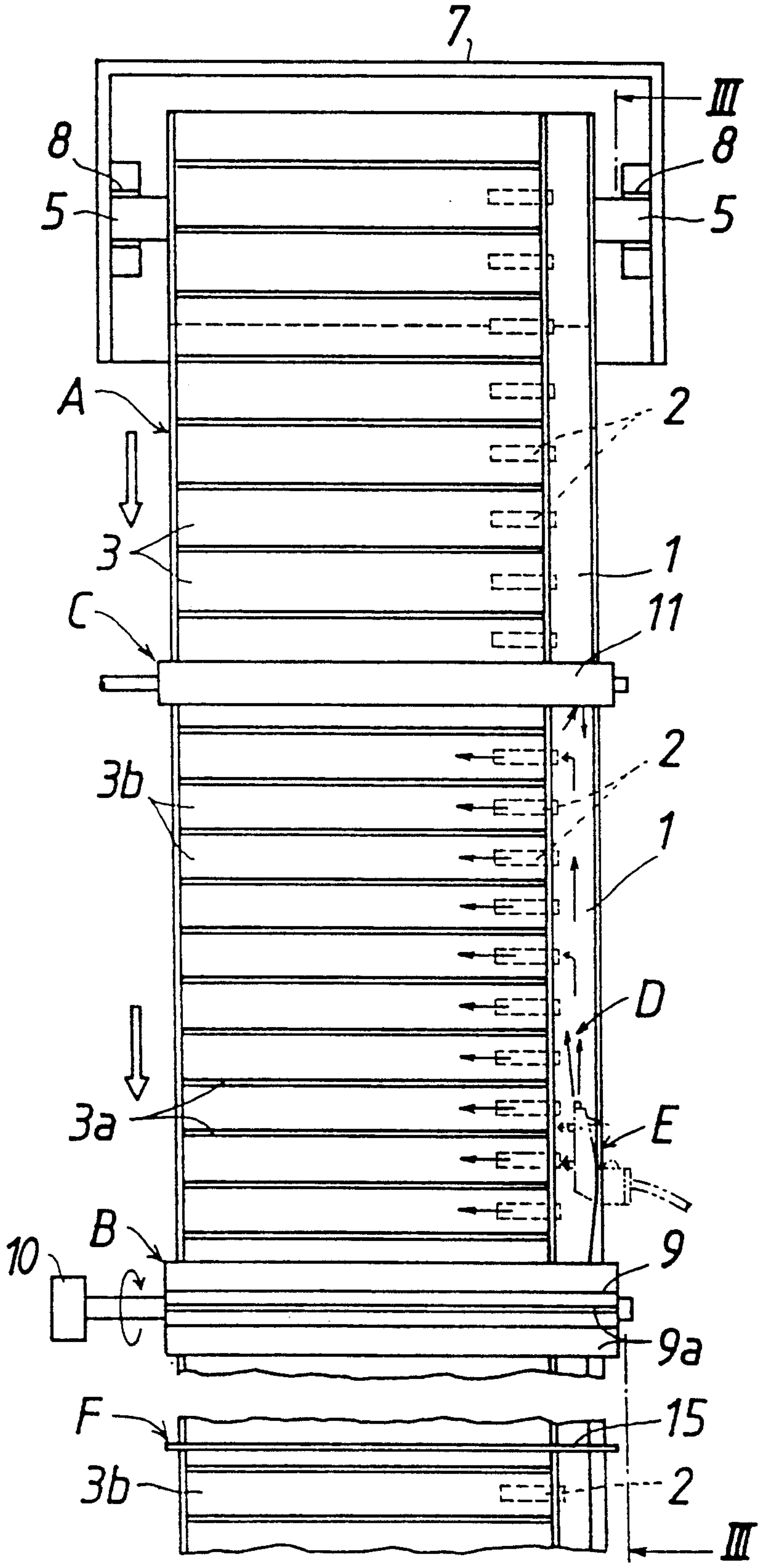
FIG. 1 is a plan view partly broken away and schematically showing an overall line for practicing a continuous filling process of the invention.
Figure 2:
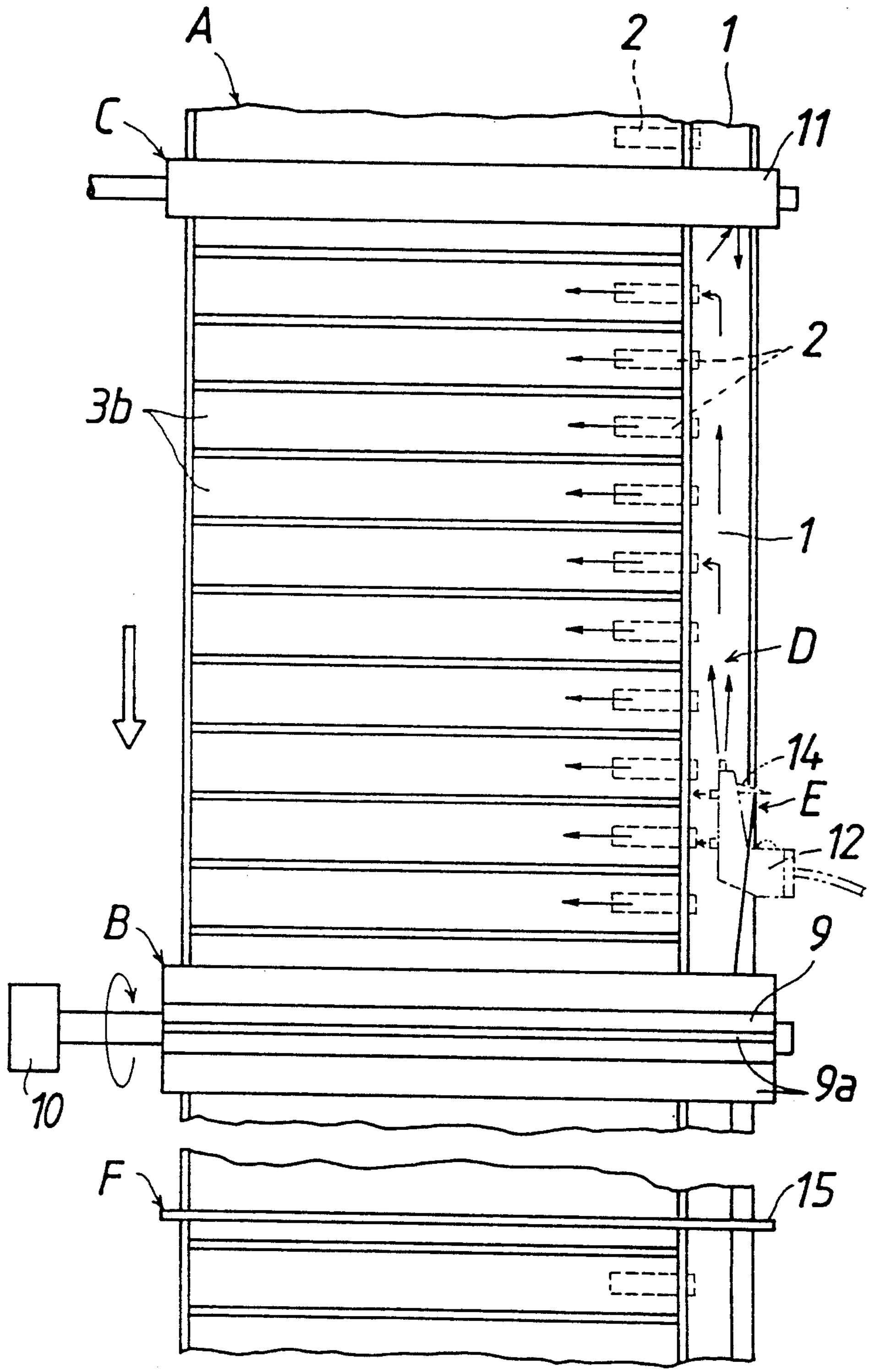
FIG. 2 is an enlarged fragmentary view of FIG. 1.

With reference to the accompanying drawings, embodiments of the invention will be described below in which air is used as the fluid to be filled.

The process of the invention is adapted to continuously fill a fluid, e.g., air, into closed flat bags joined together in the form of an elongated sheet A and provided with an air inlet tube as included in the sheet A. The process generally comprises the step B of transporting the elongated sheet A forward, the step C of closing the inlet tube of the sheet A by pressing the tube, the step D of introducing air into the inlet tube closed by the step C during the transport of the sheet A, the step E of cutting the inlet tube open simultaneously with the introduction step D, and the step F of cutting off a required length of sheet A to separate off a group of closed bags filled with air.

According to the embodiment shown in FIGS. 1 to 5, the elongated sheet A is made of two superposed elongated plastics films and comprises a baglike flat fluid inlet tube 1, and a multiplicity of closed flat bags 3 arranged side by side along one side edge of the inlet tube 1 in the direction of introduction of the fluid into the tube (i.e., longitudinally of the tube or sheet A) and joined to one another and to the tube. The tube 1 and the bags 3 are formed by heat-sealing required portions of the films. Each of the bags 3 is provided inside thereof with a check valve 2 made of a plastics film and positioned adjacent to the inlet tube 1. The inlet tube 1 communicates with the closed bags 3 individually only through the fluid channel 4 of the check valve 2 of each bag. The elongated sheet A is wound around a core 5 into a roll 6, which is rotatably supported by bearings 8 on a support frame 7 for paying off the sheet.

In the transport step B, the elongated sheet A is held between and transported by a pair of opposed upper and lower transport impellers (pinch rolls) 9, 9 which is disposed at a predetermined distance from the roll 6 to the front thereof. To reliably fill air into the closed bags 3 over the required length of the sheet A, the impellers 9, 9 are rotated by a motor 10 intermittently at a time interval according to the present embodiment. For transport, the sheet A is kicked forward by the impellers 9, 9 with each joint 3*a* between the closed bags 3 nipped between the outer ends of opposed blades 9*a*, 9*a* of the impellers, so that the closed bags 3*b* as filled with air will not be broken by pressure when passing between the impellers 9, 9.

In the closing step C, the sheet A is pressed by being nipped between a pair of upper and lower freely rotatable rolls 11, 11 serving as closing means and disposed between the roll 6 and the impellers 9, 9 for the transport step B. With the present embodiment, the rolls 11, 11 are covered with sponge, rubber or like elastic material to preclude defacement of or damage to the sheet A and assure the rolls 11 of intimate contact with the surface of the sheet, whereby the inlet tube 1 can be closed reliably.

The closing means 11 may be provided only for the portion of the sheet where the inlet tube 1 is located.

The air introduction step D is performed by supplying air into the inlet tube 1 from a nozzle 13 of an air supply device 12 which is inserted in the tube 1 at a position a small distance to the rear of the impellers 9 for the transport step B and forwardly away from the closing means 11. Since the inlet tube 1 is closed at a position in the rear of the nozzle 13, the air introduced into the tube 1 is filled smoothly, reliably and successively into the bags 3 which are present between the supply device 12 and the closing means 11 by way of the fluid channel 4 of the check valve 2 in each bag, whereby bags 3*b* hermetically filled with air are formed continuously.

Although the position of the nozzle 13 on the supply device 12 is not limited specifically, it is desirable to provide the nozzle at a rearward end of the device 12 and/or on a side portion thereof opposed to the bag 3.

The inlet tube 1 is cut open in the step E by the transport movement of the sheet A and a knife 14 projecting from the supply device 12 according to the present embodiment. Upon coming into striking contact with the knife 14, the inlet tube 1 is reliably cut open at its outer side edge or a planar portion thereof, so that the transport of the sheet A will not be impeded in any way, consequently ensuring a continuous, smooth and reliable air filling operation as desired.

The supply device 12, although usually fixed in position, may be slightly moved in a direction opposite to the direction of transport of the sheet A. The inlet tube 1 can then be cut open more reliably.

A required length of the sheet A having bags 3*b* filled with air is cut off in the step F with a cutter 15 disposed in front of the impellers 9 for the transport step B. The cutter 15 is not limited specifically in construction.

According to the embodiment described above in detail, closed bags 3 joined to one another can be continuously filled with air. The embodiment therefore has the great advantage that groups of air-filled bags 3*b* having a desired length can be provided with a high efficiency. When air is used as the filling fluid, such groups or sheets of bags are very useful as a shock-absorbing packaging material for articles which need protection against impact.

Other materials, members or means are also usable as the sheet A or in the foregoing steps B, C, D, E and F as exemplified below.

Figure 6:
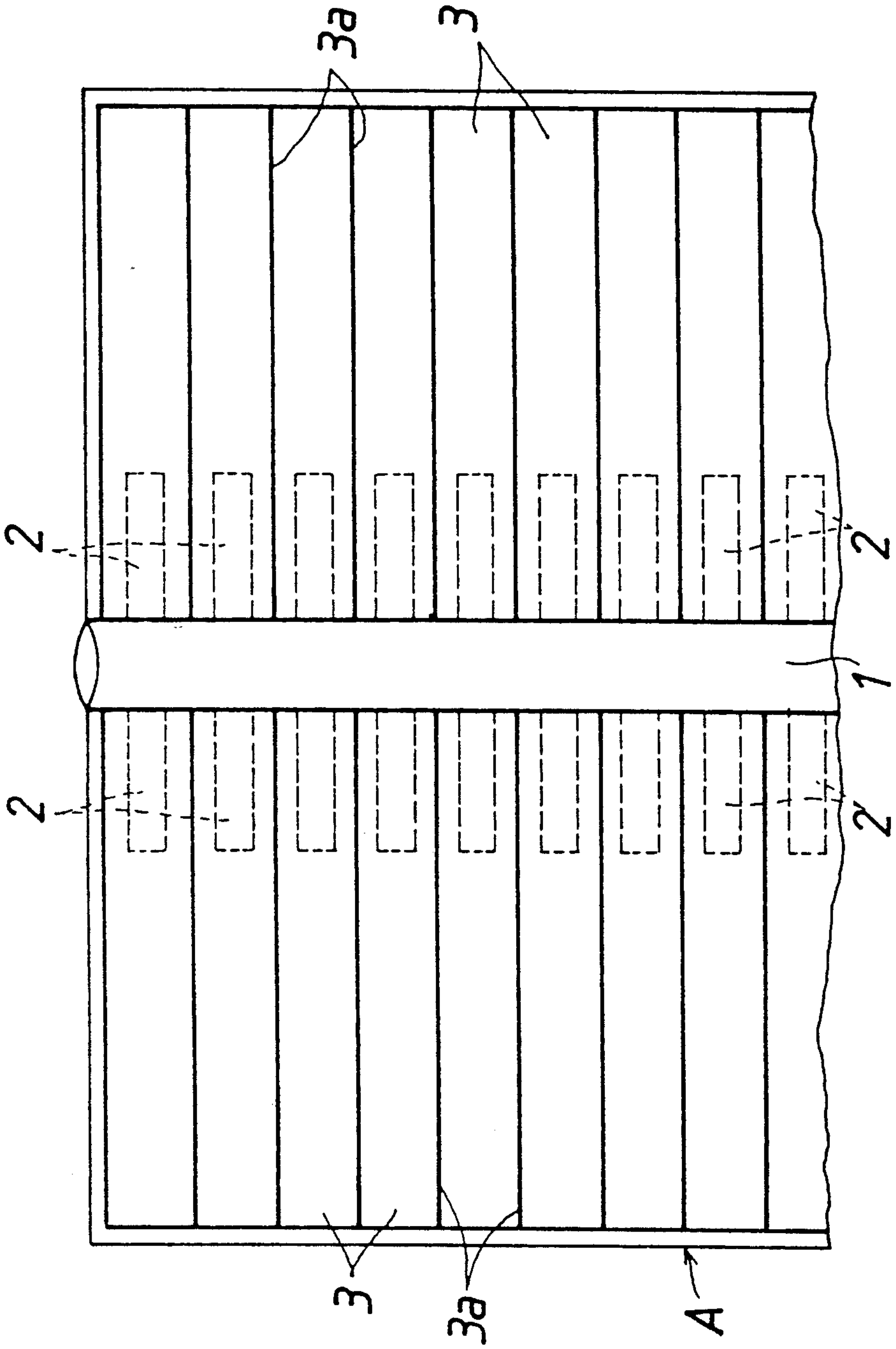
FIG. 6 is a fragmentary plan view showing another example of elongated sheet including closed bags.

The elongated sheet A is not limited to those having closed bags 3 joined only to one side edge of the inlet tube 1. Alternatively, bags 3 may be provided on both sides of the inlet tube 1 as shown in FIG. 6. Such a sheet A serves to achieve an improved production efficiency and is advantageously usable as a shock-absorbing material for corners of articles which need protection against impact.

Transport means other than the impellers 9 are usable without any limitation in the step B of transporting the sheet A insofar as they will not cause damage to bags 3*b* filled with a fluid.

For use as the closing means 11 in the step C of closing the inlet tube 1, the pair of rotatable rolls can be replaced by other means, such as plates or belts for holding the tube 1 therebetween, provided that they will not impede the transport of the sheet A.

As the cutting means to be provided on the supply device 12 for use in the fluid introduction step D, the knife 14 can be replaced by other cutting means including melting means.

Figure 3:
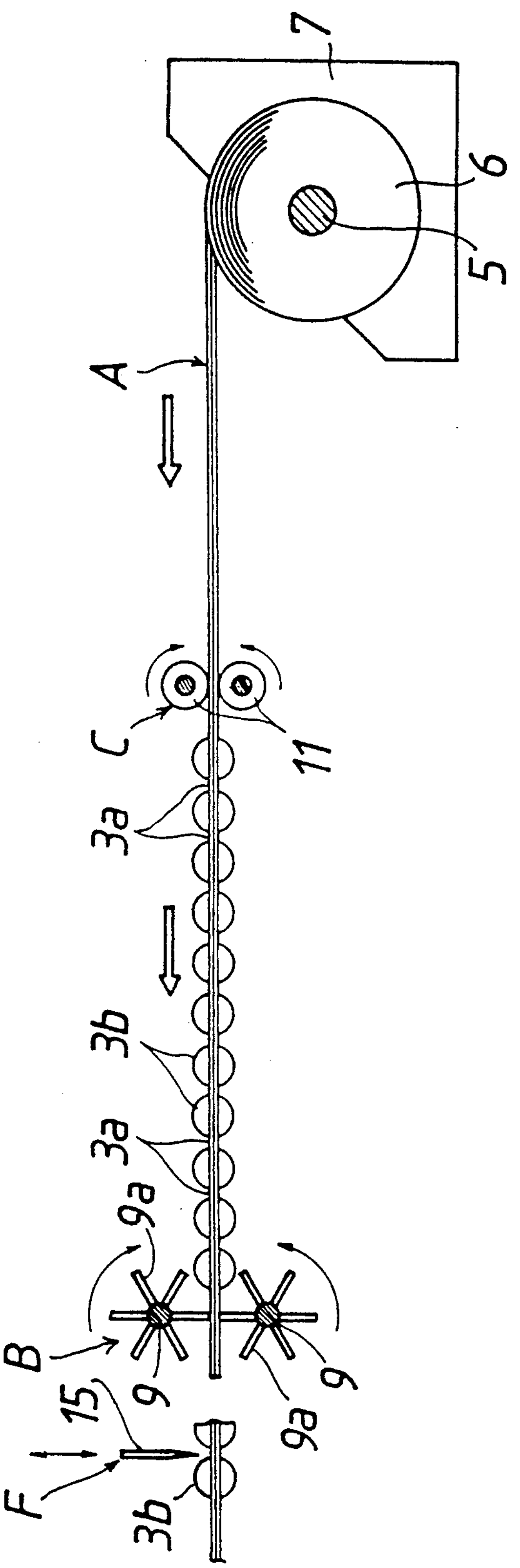
FIG. 3 is a side elevation partly omitted and in longitudinal section taken along the line III—III in FIG. 1.
Figure 4:
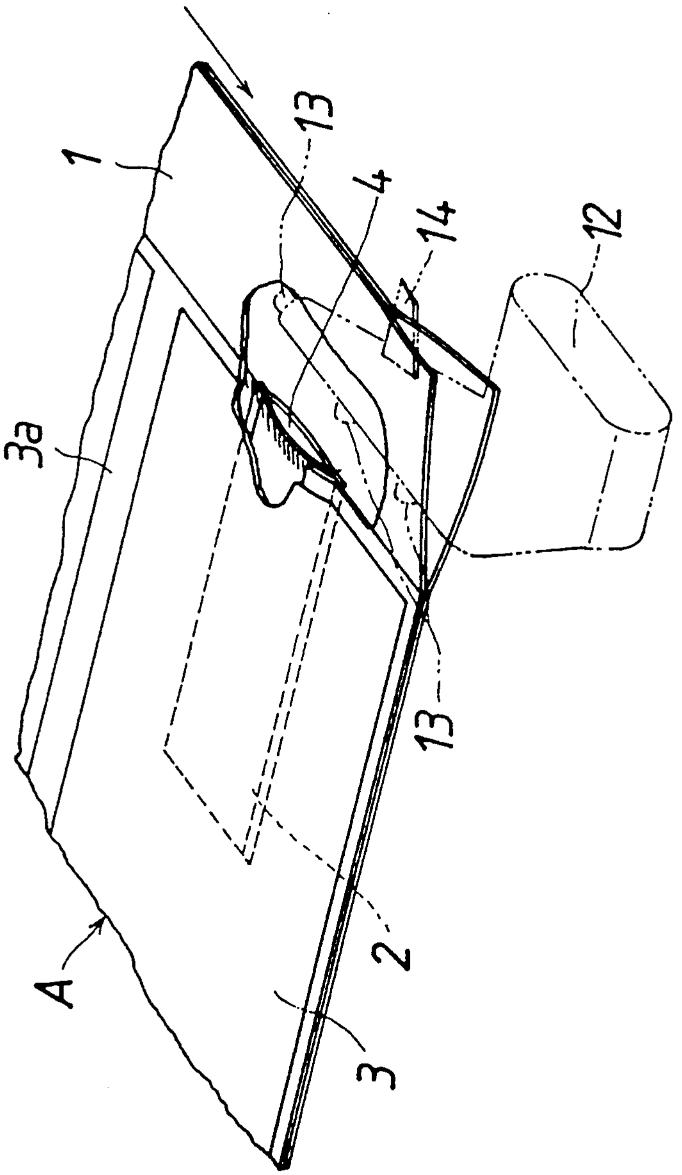
FIG. 4 is an enlarged fragmentary perspective view showing a fluid inlet tube as partly cut open.
Figure 5:
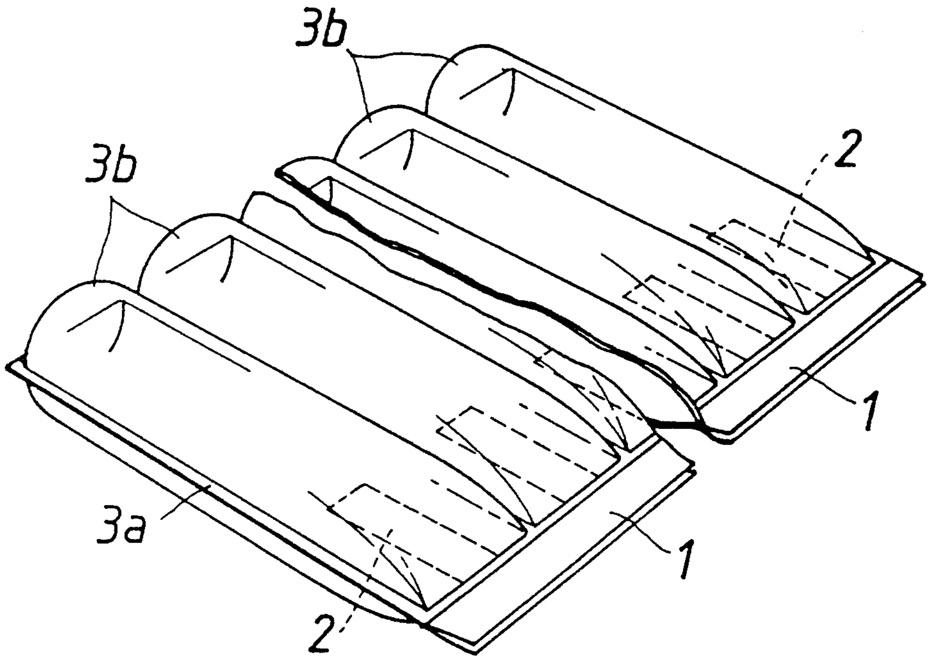
FIG. 5 is a perspective view showing a group of bags hermetically filled with a fluid.

Instead of the cutter 15 which is movable upward and downward as illustrated in FIG. 3, a roll cutter or other suitable cutting means is usable in the cutting step F.

Although the preferred embodiments of the invention have been described above in detail, the invention can be modified variously to achieve the object of the invention without departing from the scope thereof as defined in the appended claims.

What is claimed is:

1. A process for continuously filling a fluid into a plurality of closed bags joined together in the form of an elongated sheet made of two superposed elongated rectangular plastics films, the elongated sheet having a baglike flat fluid inlet tube extending longitudinally thereof and formed by heat-sealing required portions of the films, the plurality of closed bags being arranged side by side along at least one side of the inlet tube and joined to one another and to the inlet tube, each of the closed bags being provided inside thereof with a check valve made of plastics film and positioned adjacent to the inlet tube, the inlet tube being in communication with the plurality of bags individually only through a fluid channel of the check value in each bag, the process being characterized in that the process comprises the steps of:

transporting the elongated sheet forward, closing the inlet tube of the sheet by pressing the inlet tube with closing means disposed in the path of transport of the sheet, introducing the fluid into the inlet tube by a fluid supply device having a required portion inserted in the inlet tube at a position to the front of the closing means and cutting the inlet tube open longitudinally thereof by cutting means provided on the supply device utilizing the transport of the sheet, filling the closed bags positioned to the front of the closing means with the fluid introduced into the inlet tube hermetically through the check valve, and cutting off a required length of the sheet including the bags hermetically filled with the fluid.

2. A process as defined in claim 1 wherein during the transport of the elongated sheet, the fluid supply device is suitably moved rearward for the cutting means on the supply device to cut the inlet tube open longitudinally thereof.

3. A process as defined in claim 1 wherein during the transport of the elongated sheet, the fluid supply device is fixed in position for the cutting means on the supply device to cut the inlet tube open longitudinally thereof.

4. A process as defined in claim 1 wherein the elongated sheet is transported intermittently.

5. A process as defined in claim 1 wherein a side portion of the inlet tube is cut open with the cutting means on the fluid supply device.

6. A process as defined in claim 1 wherein a planar portion of the inlet tube is cut open with the cutting means on the fluid supply device.

* * * * *